(12) United States Patent
Lang et al.

(10) Patent No.: US 6,311,953 B1
(45) Date of Patent: Nov. 6, 2001

(54) METHOD OF BLOWING CABLE INTO A DUCT

(75) Inventors: Ian Dewi Lang; Ralph Sutehall; Martin Vincent Davies, all of Newport; John Garth Lamb, Herefordshire, all of (GB)

(73) Assignee: Pirelli General plc, London (GB)

( * ) Notice: Subject to any disclaimer, the term of this patent is extended or adjusted under 35 U.S.C. 154(b) by 0 days.

(21) Appl. No.: 09/559,729

(22) Filed: Apr. 28, 2000

(30) Foreign Application Priority Data

Apr. 29, 1999 (GB) .................................................. 9909912

(51) Int. Cl.[7] ........................................................ B60F 3/24
(52) U.S. Cl. .................................. 254/134.4; 254/134.3 R
(58) Field of Search ........................... 254/134.4, 134.3 R

(56) References Cited

U.S. PATENT DOCUMENTS

| | | | |
|---|---|---|---|
| 5,022,634 | * | 6/1991 | Keeble ............................... 254/134.4 |
| 5,467,968 | * | 11/1995 | Proud et al. ...................... 254/134.4 |
| 5,499,797 | * | 3/1996 | Sano et al. ........................ 254/134.4 |
| 5,573,225 | * | 11/1996 | Boyle et al. ...................... 254/134.4 |
| 5,645,267 | * | 7/1997 | Reave et al. ...................... 254/134.4 |

FOREIGN PATENT DOCUMENTS

| | | |
|---|---|---|
| 40 11 265 A1 | 10/1991 | (DE) . |
| 198 15 596 A1 | 10/1999 | (DE) . |
| 0 475 815 A1 | 3/1992 | (EP) . |

* cited by examiner

*Primary Examiner*—Lee Wilson
(74) *Attorney, Agent, or Firm*—Finnegan, Henderson, Farabow, Garrett & Dunner, L.L.P.

(57) ABSTRACT

In order to install an optical fiber cable 110 in a duct 112 a plurality of vents 130, 132, 134 spaced apart along the duct are operated such that during blowing any vent 130 upstream of the leading end 138 of the cable is closed and when there is at least one vent 132, 134 downstream of the cable leading end at least the downstream vent 132 closest to the cable leading end is open for venting gas from the duct. In this way the pressure decay and pressure gradient profiles are modified during installation to improve installation performance.

18 Claims, 3 Drawing Sheets

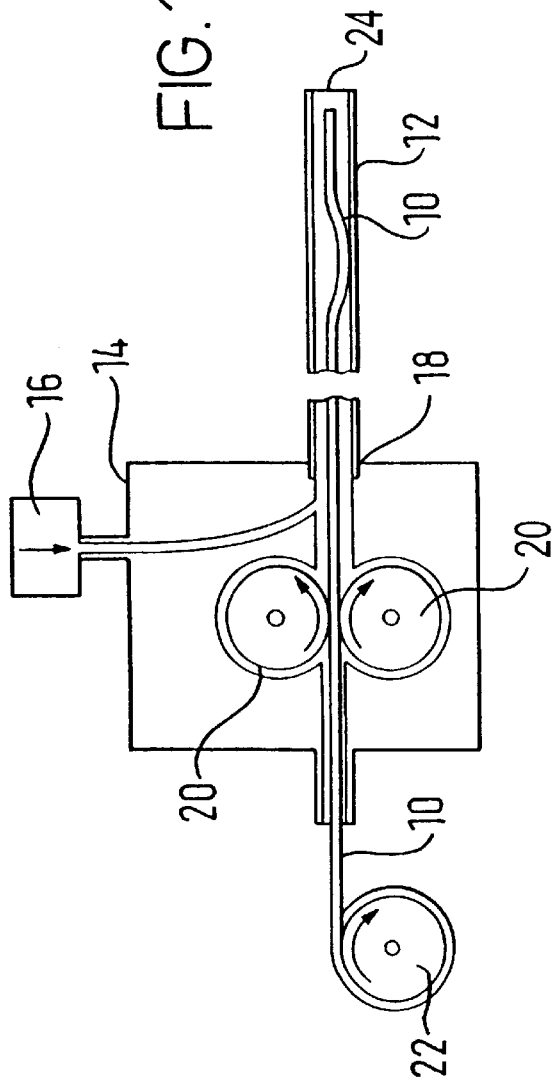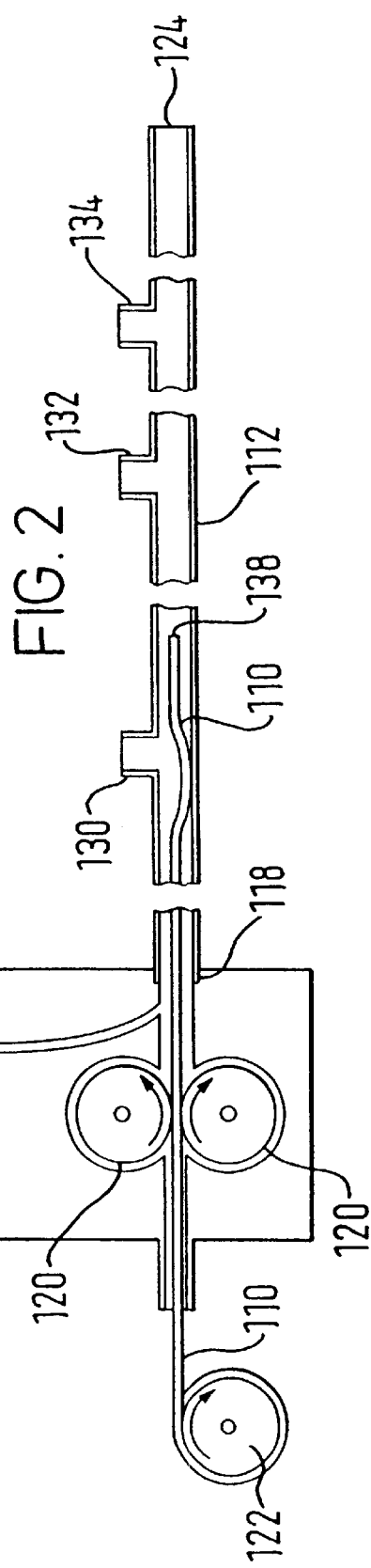

METHOD OF BLOWING CABLE INTO A DUCT

CROSS-REFERENCES TO RELATED APPLICATIONS

Figure 3:
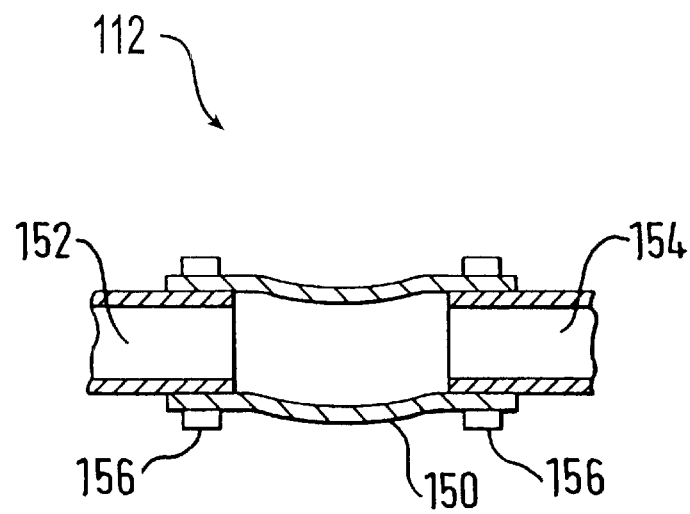

Applicants claim the right of priority under 35 U.S.C. §119(a)–(d) based on patent application No. 9909912.9, filed Apr. 29, 1999, in the United Kingdom, the content of which is relied upon and incorporated herein by reference.

This invention relates to a method of installing a cable in a duct by blowing the cable into the duct using gaseous flow which is fed into one end of the duct together with the cable.

The invention is particularly, but not exclusively, applicable to installing an optical fibre cable having a plurality of optical fibres contained within a common sheath. It is also applicable to installing a single optical fibre provided with one or more protective coatings, and the term 'cable' as used herein is to be construed accordingly. Further, the invention may also be applicable to installing cables having one or more electrical conductors additional to or instead of optical fibres.

The blowing force exerted on the cable by the gaseous flow, which is usually high speed airflow, is proportional to the pressure gradient in the duct. The pressure gradient is not constant along the length of the duct and is usually lowest at the end of the duct into which the gaseous medium and cable are fed. The pressure gradient also depends on the distance along the duct from that end to the other end of the duct at which the gaseous flow is vented to atmosphere.

An object of the invention is to increase the length of cable which can be blown into the duct.

Briefly this object is achieved by modifying the pressure gradient within the duct during passage of the leading end of the cable through the duct. This modification is effected by selective venting of the duct at locations along its length.

The invention includes a method of installing a cable in a duct comprising blowing the cable into the duct using a gaseous flow which is fed into one end of the duct together with the cable, wherein a plurality of venting means are spaced apart along the length of the duct, and wherein the venting means are operated such that during blowing, any venting means which is upstream of the leading end of the cable is closed and when there is at least one venting means downstream of said leading end, at least the downstream venting means closest to the cable leading end is open for venting gas from the duct.

Each of said venting means may comprise a disconnectable connection between adjacent sections of said duct.

Preferably during blowing, any venting means which is downstream of the cable leading end is open.

The method may further include pulling said cable into said duct using a shuttle attached to the leading end of said cable and provided with through passageway means for said gaseous flow.

Advantageously, the flow area of the through passageway means may be varied during blowing. Preferably the through passageway means comprises at least one through passageway which has a fixed flow area and at least one through passageway which has a variable flow area.

The method may further comprise pushing said cable into said duct at said one end thereof.

In one embodiment described hereinafter all of the venting means are initially open and said venting means are successively closed by engagement with said shuttle as said shuttle travels along said duct from said one end thereof.

Figure 5:
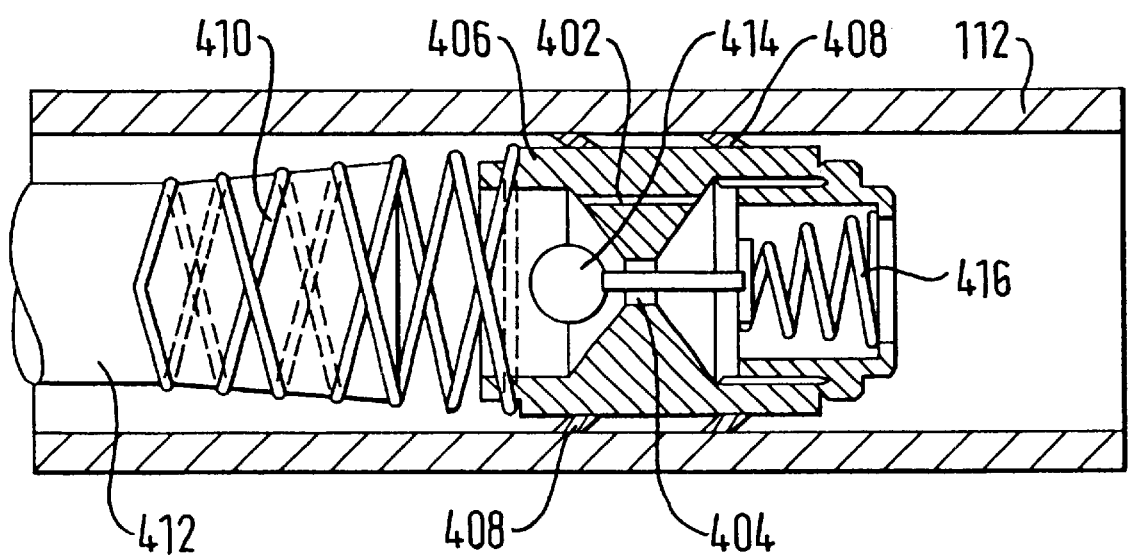
Figure 4A:
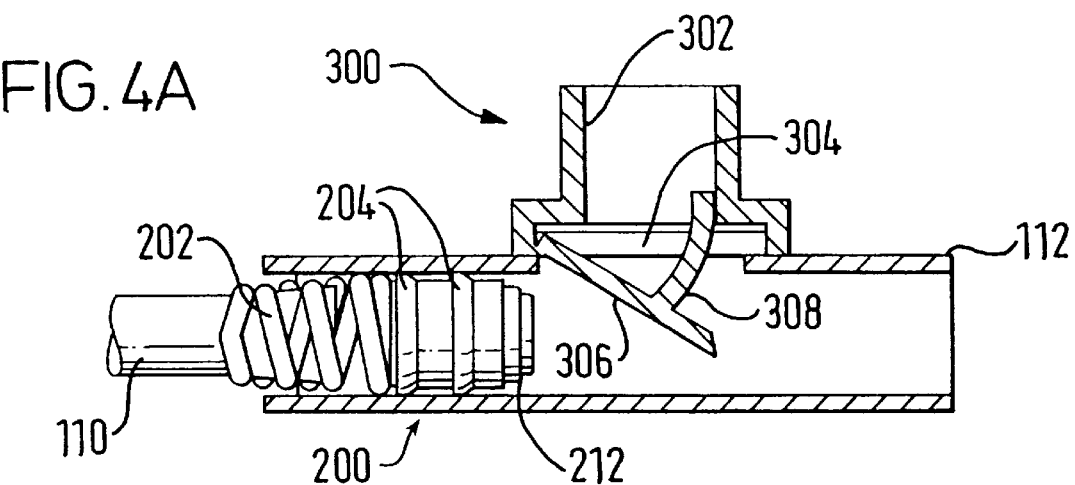
Figure 4B:
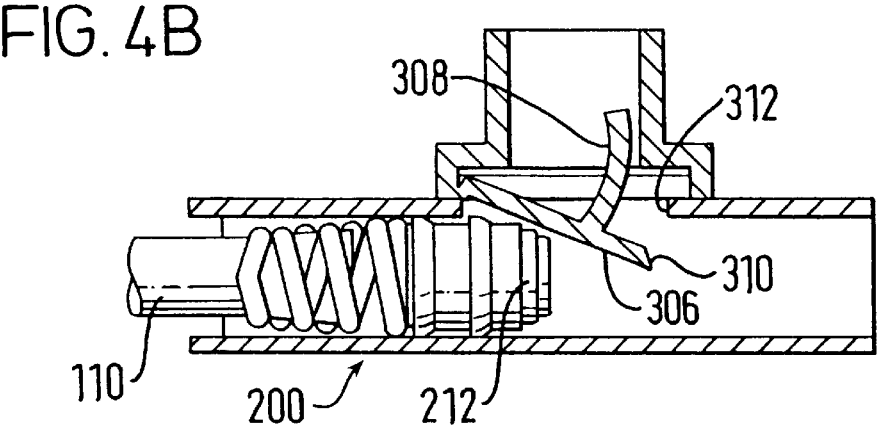
Figure 4C:
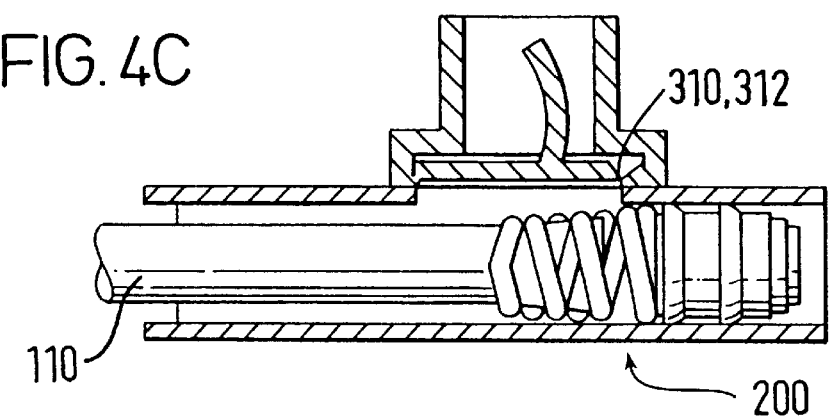

In order that the invention may be well understood, embodiments thereof, which are given by way of example only will now be described with reference to the accompanying drawings, in which:

FIG. 1 schematically illustrates a known method of installing an optical fibre cable in a duct;

FIG. 2 schematically illustrates a method of installing an optical fibre cable in a duct embodying the present invention;

FIG. 3 schematically illustrates a disconnectable connection between adjacent sections of the duct of FIG. 2 forming a venting means;

FIGS. 4A–C are schematic views illustrating passage of a shuttle provided on the leading end of the cable past an alternative venting means; and FIG. 5 is a schematic view of an alternative shuttle.

Referring first to FIG. 1, there is shown an optical fibre cable 10, comprising a plurality of optical fibres contained within a common sheath being blown into a duct 12 by a blowing head 14 which provides a supply of gaseous flow, in the form of airflow from a compressed air source 16. To overcome the pressure drop at the cable inlet 18 of the duct 12 the cable is pushed into the duct by driven wheels 20 engaged therewith which also pull the cable from a supply reel 22. Traction belts (not shown) may be used instead of wheels 20. Once the cable is fed into the duct the installation may be continued using only the blowing force provided by the compressed airflow.

The total blowing force, which comprises a hydrostatic force and a hydrodynamic force, exerted on the cable is proportional to the pressure gradient in the duct as mentioned above. As disclosed in Appendix 2 of 'A new installation method for conventional fibre optical cables in conduits', IWCS 1988, pp 172–178, the pressure in the duct 12 decays over the length of the duct (ie from its inlet end 18 to its outlet end 24) non-linearly and the pressure gradient increases non-linearly from the inlet end 18 of the duct to the outlet end 24 of the duct. The pressure gradient in the first part of the duct adjacent the inlet end 18 may be almost an order of magnitude lower than at the outlet end 24. Thus the blowing force in the first part of the duct will be smaller than the blowing force at the outlet end by the same factor. In most duct routes the blowing force cannot attain the shortcomings at the inlet end and for this reason performance can be improved by applying an additional pushing force to the cable at the inlet end.

This additional pushing force may be provided and when so provided may be by use of the driven wheels 20 or traction belts which are used to overcome the pressure drop at the inlet end 18 at the start of the installation process.

The embodiment of the invention illustrated in FIG. 2 increases the length of duct into which a cable can be blown and/or allows the pushing force applied to the cable at the inlet end of the duct to be reduced or eliminated.

In FIG. 2, parts which correspond to parts in FIG. 1 have been given the same reference numerals increased by 100.

In the installation method illustrated in FIG. 2 the duct 112 into which the cable is installed is appreciably longer than the duct 12 of FIG. 1. A plurality of venting means 130, 132 and 134 are spaced apart along the length of the duct between the inlet and outlet ends 118, 124 thereof. Each venting means 130, 132 or 134 may be open for venting air from the duct 112 or closed in which case no venting at that venting means occurs. The venting means are used to change the pressure decay profile within the duct during installation.

In FIG. 1 (or with all of the venting means in FIG. 2 closed) the pressure decay profile and thus the pressure gradient profile extends between the inlet and the outlet of the duct. In the installation method of FIG. 2, the pressure decay and pressure gradient profiles along the duct 112 are modified during installation. In particular, at commencement of an installation the venting means 130 closest to the inlet 118 is open for venting airflow from the duct so that when the leading end 138 of the cable is upstream of the venting means 130 the pressure decay and pressure gradient profiles extend over the length of duct between the inlet 118 and the venting means 130 and not over the whole length of the duct. The venting means 132, 134 and the outlet end of the duct (which is also a venting means for the duct) may be open or closed during this initial phase of the installation but for reasons that will become apparent they are preferably open.

After the leading end 138 of the cable has passed venting means 130 and the venting means 130 is upstream of the cable leading end 138 (as depicted in FIG. 2), the venting means 130 is closed and the next downstream venting means 132 is open to allow venting of airflow from the duct. If the venting means 132 is already open, as preferred, no operation of it is required. With the venting means 130 closed and the venting means 132 open, the pressure decay and pressure gradient profiles extend over the length of the duct between the inlet 118 and the venting means 132.

After the cable leading end has passed venting means 132 it is closed so that the two venting means 130, 132 upstream of the cable leading end 138 are closed, and the next downstream venting means 134 is open so that the pressure decay and pressure gradient profiles extend over the length of cable between the inlet 118 and the venting means 134. After the cable leading end 138 has passed venting means 134 and venting means 134 is upstream of the cable leading end, the venting means 134 is closed and the pressure decay and pressure gradient profiles extend over the whole length of the duct from its inlet 118 to its outlet 124.

Any number of venting means may be provided in the duct and it will be appreciated from the above that during blowing any venting means which is upstream of the cable leading end is closed and when there is at least one venting means downstream of the cable leading end, at least the downstream venting means closest to the cable leading end is open for venting gas from the duct. It will also be appreciated that in order to reduce the number of switching operations of the venting means, preferably during blowing any venting means which is downstream of the cable leading edge is open. Thus before commencement of a blowing operation all of the venting means are open, and the venting means are successively closed as the cable leading end passes along the duct.

It will be understood that by changing the extent of the pressure decay and pressure gradient profiles during blowing, the blowing force acting on the cable along its length within the duct during the phases of operation when the airflow is vented through the venting means 130, 132 or 134 is greater than that when the airflow is vented through the duct outlet end as in FIG. 1 and the final phase of operation of FIG. 2 when venting means 130, 132 and 134 are closed.

In a simple application of the method of FIG. 2, each of the venting means may be a disconnectable connection between adjacent sections of the duct 112. As schematically illustrated in FIG. 3 such connections may comprise the usual flexible pipe connection 150 provided between adjacent lengths 152, 154 of ducting and secured thereto by hose clips 156. In the method these connections would be initially disconnected and then connected successively as the leading end of the cable passes from one ducting length to the next.

In a modification of the method of FIG. 2, a pulling force is exerted on the cable by a shuttle attached to the leading end of the cable and provided with through passageway means for the compressed airflow. An example of such a shuttle is shown in FIG. 2a of EP 0445858A and comprises a generally cylindrical composite body defining a through passageway and having a pulling eye at one end for attachment to the cable leading end and two annular seals which are axially spaced apart along the length of the body for sealingly engaging the inside of the duct in which the cable is being installed.

The provision of a shuttle on the leading end as well as assisting installation, may be utilised for closing the venting means 130, 132, 134 as the shuttle progresses along the duct 112. In this connection, reference is made to FIGS. 4A, B and C which show the progress of a shuttle 200 which is attached to the leading end of the cable 110 by a tensile resistant stocking connection 202, past a venting means here designated 300, but corresponding to each of the venting means 130, 132 and 134. The shuttle 200 has axially spaced apart seals 204 which engage the inside of the duct 112 and a through passageway (not shown) for allowing airflow through the shuttle. The venting means 300 comprises a branch duct 302 fitted to the duct 112 and in flow communication with the inside of the duct by way of an aperture 304 in the wall thereof. A valve flap 306 is provided for closing the aperture 304 and thus airflow from the duct 112 to the branch duct 302. The flap is hinged at its upstream end to the duct and in an open condition of the venting means 300 is disposed in the path of the shuttle 200 as shown in FIG. 4A. An element 308 attached to the flap 306 engages a part of the branch duct to limit opening pivotal movement of the flap to the position shown in FIG. 4A. As the shuttle moves past the venting means 300, a leading portion 212 of the shuttle 200 engages the flap 306 (FIG. 4B) to pivot it towards a position in which the flap closes the aperture 304, which position is shown in FIG. 4C. A free edge 310 of the flap snaps over an edge 312 of the aperture 304 to retain the flap in the closed position as shown in FIG. 4C.

As will be appreciated a plurality of venting means 300 corresponding to venting means 130, 132 and 134 provided in FIG. 2 are initially set with their flaps 306 in the open position (FIG. 4A) and are successively closed by engagement with the shuttle as the duct travels along the duct 112 from the inlet end 118 thereof towards the outlet end 124 of the duct.

It is to be understood that other means may be employed to automatically successively close each venting means as the leading end of a cable (whether provided with a shuttle or not) travels along the duct.

In a further development the flow area of the through passageway means of the shuttle is varied during travel of the shuttle along the duct. In particular, as the shuttle travels along the duct between the inlet end 118 and the venting means 130, between the venting means 130 and 132, between the venting means 132 and 134 and between the venting means 134 and the outlet 124, the pressure immediately upstream of the shuttle and thus the pressure drop across the shuttle decreases. In order to compensate for this situation the flow area of the shuttle is increased automatically as the pressure drop decreases in order to improve installation performance. FIG. 5 shows an example of such a shuttle 400 which comprises a through passage 402 which has a fixed flow area and a through passage 404 which has a variable flow area. More than one fixed flow area passageway 402 and more than one variable flow area passageway 404 may be provided.

The shuttle comprises a body 406 carrying axially spaced apart seals 408 for engaging the inside of the duct and attached to a tensile resistant stocking 410 for attaching the shuttle to the leading end of the cable, here referenced 412. The area of the variable flow area passageway is controlled by a valve member 414 which is biased in an upstream direction by a spring 416 towards a fully open position (as shown). When the valve member 414 is in a fully closed position flow through the shuttle 400 is able to occur through fixed flow area passageway 402.

As the shuttle travels through the duct from the inlet end 118 thereof towards the first venting means 130 (which is open) the pressure drop across the shuttle decreases and the valve member 414 opens under the bias of the spring to increase the flow area of passageway 404 and cause the pulling force on the cable to decrease. When the shuttle moves past the first venting means 130 to close the same pressure in the duct immediately upstream of the shuttle and thus the pressure drop across the shuttle increases and the valve member moves against the bias of the spring to a more closed position to increase the pulling force exerted on the cable. Thereafter as the shuttle moves towards the second venting means 132 (which is open) the pressure drop across the shuttle decrease sand the valve member 414 opens under the bias of the spring. The valve member operates similarly during passage of the shuttle past venting means 132 and towards venting means 134, and past venting means 134 and towards the duct outlet end 124.

What is claimed is:

1. A method of installing a cable in a duct, wherein a plurality of venting means are spaced apart along a length of the duct, comprising:

providing the cable;

blowing the cable into the duct using a gaseous flow which is fed into one end of the duct together with the cable; and operating the plurality of venting means such that during blowing, when one or more of the plurality of venting means is upstream of a leading end of the cable, each of the one or more upstream venting means is closed and, when one or more of the plurality of venting means is downstream of the leading end of the cable, at least a downstream venting means closest to the leading end of the cable is open for venting gas from the duct.

2. The method of claim 1, wherein each of the venting means comprises a disconnectable connection between adjacent sections of the duct.

3. The method of claim 1, wherein during blowing, when one or more of the plurality of venting means is downstream of the leading end of the cable, each of the downstream venting means is open.

4. The method of claim 1, further comprising pulling the cable into the duct using a shuttle attached to the leading end of the cable and provided with through passageway means for the gaseous flow.

5. The method of claim 4, wherein a flow area of the thorough passageway means is varied during travel of the shuttle along the duct.

6. The method of claim 5, wherein the through passageway means comprises at least one through passageway which has a fixed flow area and at least one through passageway which has a variable flow area.

7. The method of claim 4, wherein all of the venting means are initially open and the venting means are successively closed by engagement with the shuttle as the shuttle travels along the duct from the one end thereof.

8. The method of claim 1, further comprising pushing the cable into the duct at the one end thereof.

9. The method of claim 1, wherein the gaseous flow is air flow.

10. A method of installing a cable in a duct, wherein a plurality of venting means are spaced apart along a length of the duct, comprising:

locating a leading end of the cable near one end of the duct;

blowing the cable into the duct using a gaseous flow which is fed into the one end of the duct together with the cable; and operating the plurality of venting means such that during blowing, when one or more of the plurality of venting means is upstream of the leading end of the cable, each of the one or more upstream venting means is closed and, when one or more of the plurality of venting means is downstream of the leading end of the cable, at least a downstream venting means closest to the leading end of the cable is open for venting gas from the duct.

11. The method of claim 10, wherein each of the venting means comprises a disconnectable connection between adjacent sections of the duct.

12. The method of claim 10, wherein during blowing, when one or more of the plurality of venting means is downstream of the leading end of the cable, each of the downstream venting means is open.

13. The method of claim 10, further comprising pulling the cable into the duct using a shuttle attached to the leading end of the cable and provided with through passageway means for the gaseous flow.

14. The method of claim 13, wherein a flow area of the thorough passageway means is varied during travel of the shuttle along the duct.

15. The method of claim 14, wherein the through passageway means comprises at least one through passageway which has a fixed flow area and at least one through passageway which has a variable flow area.

16. The method of claim 13, wherein all of the venting means are initially open and the venting means are successively closed by engagement with the shuttle as the shuttle travels along the duct from the one end thereof.

17. The method of claim 10, further comprising pushing the cable into the duct at the one end thereof.

18. The method of claim 10, wherein the gaseous flow is air flow.

* * * * *